United States Patent [19]
Scott

[11] Patent Number: 4,815,259
[45] Date of Patent: Mar. 28, 1989

[54] ROTARY LAWN MOWER GANG FRAME

[76] Inventor: Wayne Scott, Rte. 1, Box 48, Saunemin, Ill. 61769

[21] Appl. No.: 165,621

[22] Filed: Mar. 8, 1988

[51] Int. Cl.⁴ .......................................... A01D 34/66
[52] U.S. Cl. ........................................ 56/6; 56/15.5; 280/412; 280/411.1
[58] Field of Search .................. 56/6, 7, 14.7, 15.5, 56/15.6; 280/411 R, 411 C, 412, 413

[56] References Cited

U.S. PATENT DOCUMENTS

| | | |
|---|---|---|
| 1,961,710 | 6/1934 | Pol .................................... 56/6 |
| 2,525,047 | 10/1950 | Sawtelle et al. ................... 56/6 |
| 3,058,280 | 10/1962 | Lewis ................................. 56/6 |
| 3,085,385 | 4/1963 | Hansen et al. .................... 56/6 |
| 3,096,606 | 7/1963 | Weir ................................... 56/6 |
| 3,514,126 | 5/1970 | Fuss ................................... 56/6 |
| 3,608,284 | 9/1971 | Erdman ............................. 56/6 |
| 3,757,500 | 9/1973 | Averitt ............................... 56/6 |
| 3,832,834 | 9/1974 | Kovacs .............................. 56/6 |
| 4,021,996 | 5/1977 | Bartlett et al. ..................... 56/6 |
| 4,063,748 | 12/1977 | Schmidt ............................. 56/6 |
| 4,178,741 | 12/1979 | Lonn et al. ........................ 56/6 |
| 4,183,196 | 1/1980 | Oosterling et al. ................ 56/6 |
| 4,287,706 | 9/1981 | Tobin, Jr. .......................... 56/6 |
| 4,330,981 | 5/1982 | Hall et al. .......................... 56/6 |
| 4,478,026 | 10/1984 | Mullet et al. ...................... 56/6 |
| 4,481,755 | 11/1984 | Carr ................................... 56/7 |
| 4,587,800 | 5/1986 | Jimenez ............................. 56/6 |
| 4,637,625 | 1/1987 | Blackwell ......................... 56/6 |
| 4,679,384 | 7/1987 | van der Ley et al. ............. 56/6 |

*Primary Examiner*—John Weiss
*Attorney, Agent, or Firm*—Willian Brinks Olds Hofer Gilson & Lione Ltd.

[57] ABSTRACT

A frame for ganging a plurality of individually powered rotary lawn mowers together for towing by a vehicle in cutting lawn or the like has T-shaped draft bars which have cross-bar portions pivotally attached to the brackets of skid units mounted to the forward ends of off-the-shelf rotary mowers. Skid units are additionally provided on the rearward end of a first lawn mower, which has the tow bar of its T-shaped draft bar pivotally attached to a vehicle for towing. An intermediate elongated draft bar is attached to the brackets of the first lawn mower's rearward skid units. The tow bars of second and third lawn mowers are attached to the intermediate draft bar on either side of the first lawn mower such that the respective cutting paths of the second and third mowers at least slightly overlap the cutting path of the first lawn mower.

5 Claims, 3 Drawing Sheets

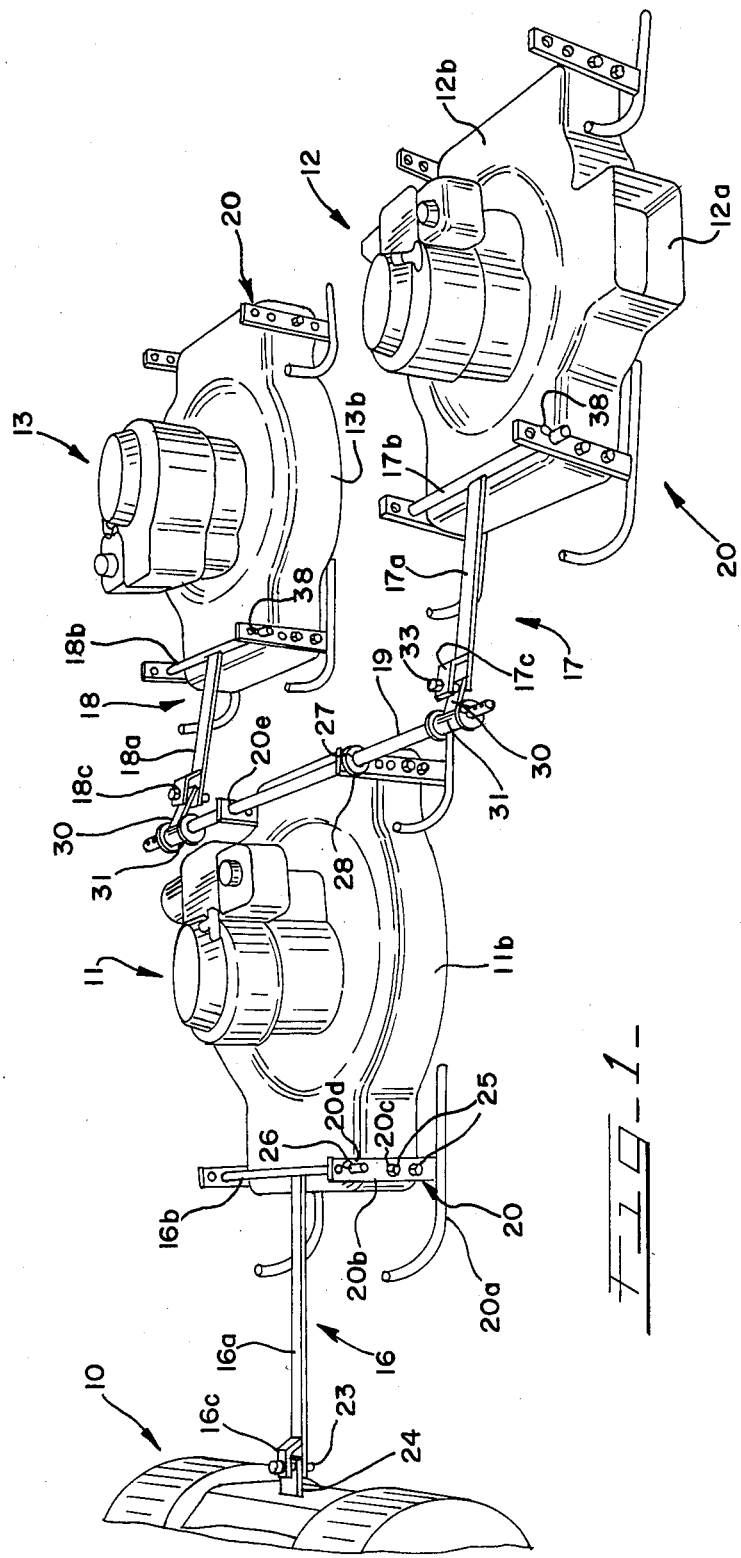

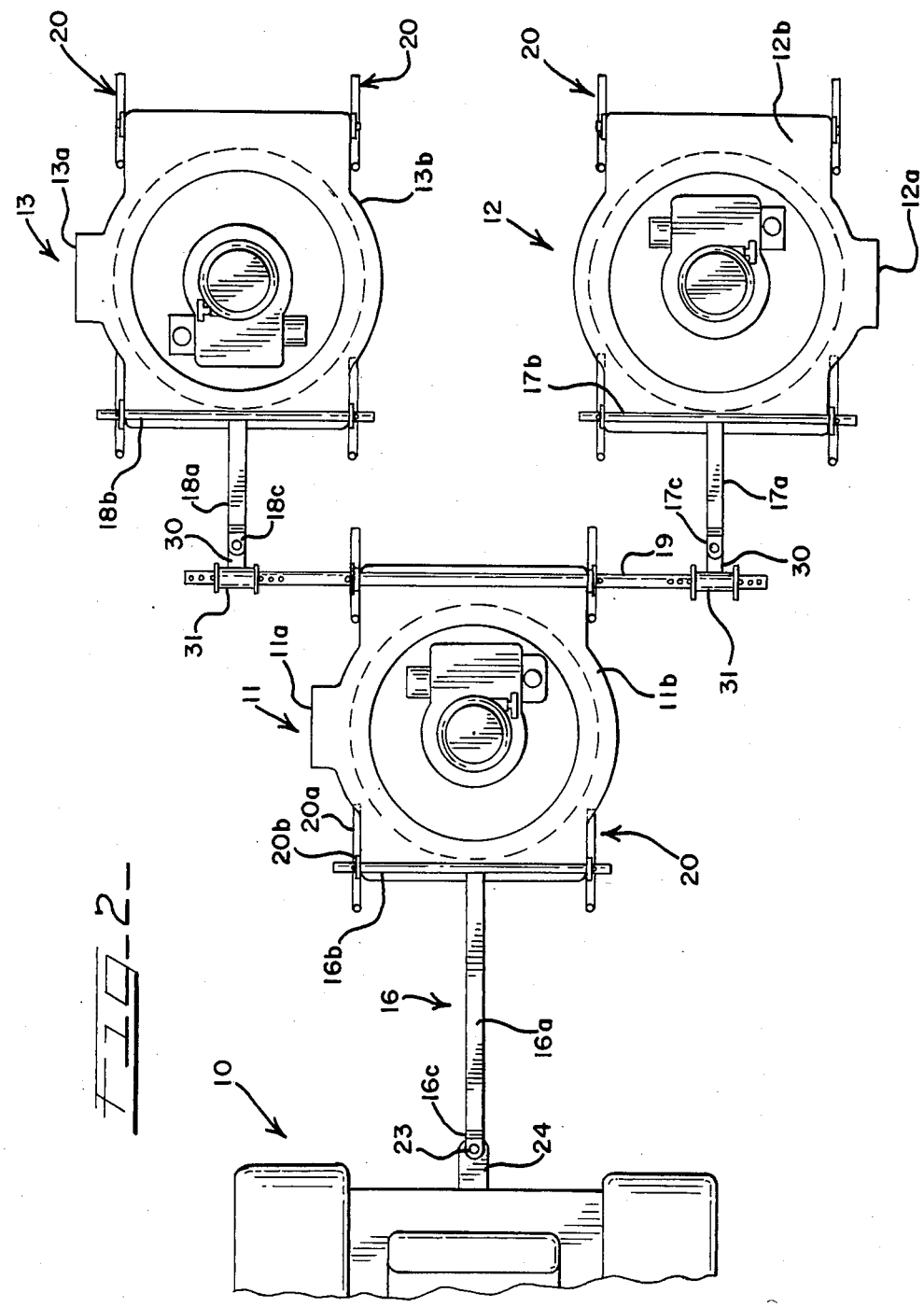

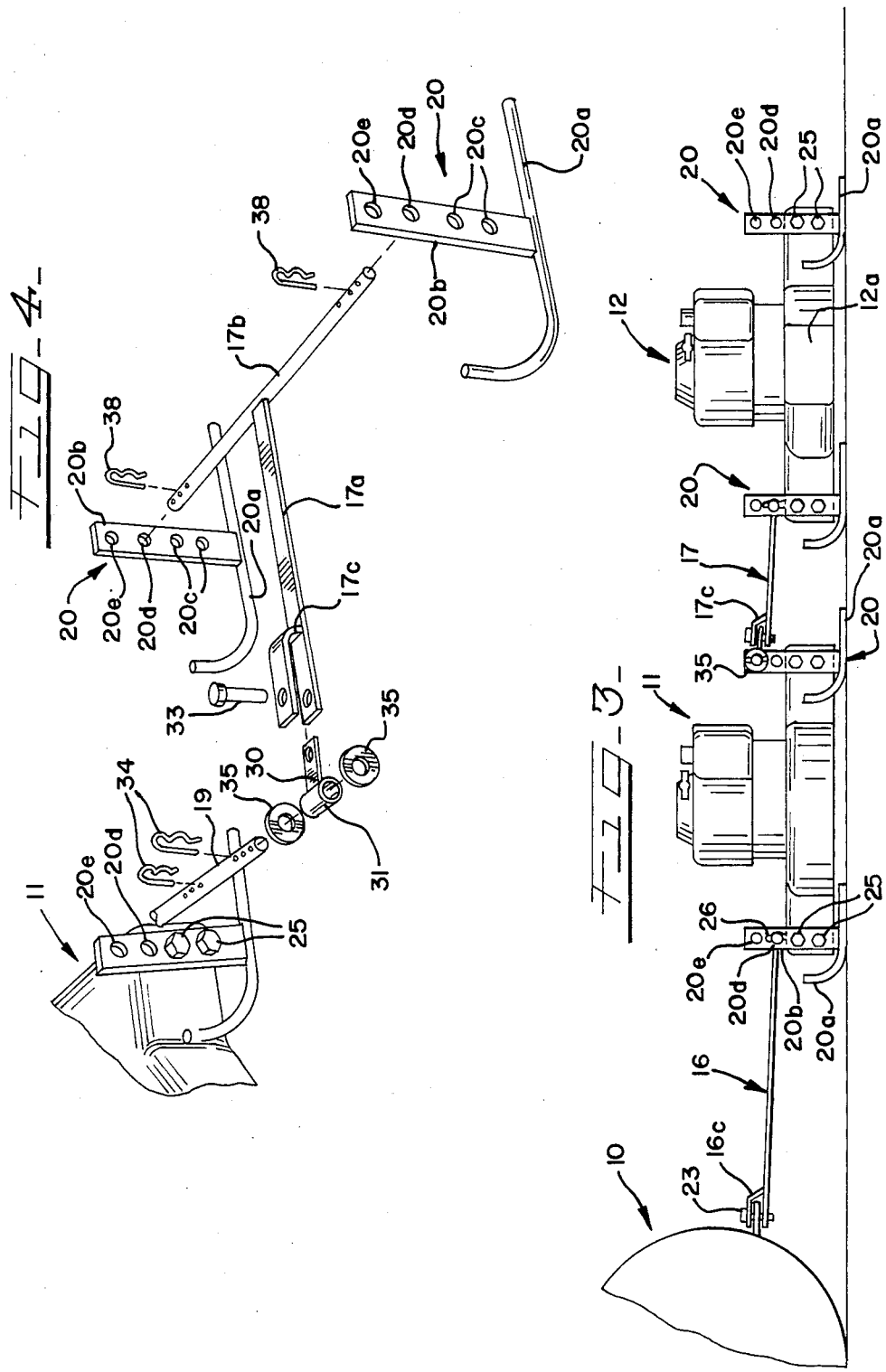

ROTARY LAWN MOWER GANG FRAME

FIELD OF THE INVENTION

The present invention relates generally to mowers for lawns and similar vegetation, more particularly to devices for ganging a plurality of lawn mowers together for towing behind a lawn tractor or similar vehicle.

BACKGROUND OF THE INVENTION

Devices for ganging a plurality of lawn mowers together to thereby create a widened cutting path are well known. See, for example, U.S. Pat. Nos. 3,608,284; 3,832,834; 3,757,500; 4,063,748; 4,330,981; and 4,287,706. Ganging individual mowers together is obviously useful to create, essentially, one large mowing unit to reduce the numbers of passes required to maintain large lawns, golf fairways and the like.

Ganging individual mowers together has certain advantages over a single large mower unit specifically adapted for cutting wide swathes, such as a significant reduction in cost for the ganged mower unit. Further, if a breakdown occurs in one of the individual mowers in a ganged unit, then that mower can be replaced with a new unit without significant down-time.

Ganging assemblies for a plurality of reel mowers are old. Ganging frames and hitches for a plurality of rotary-type lawn mowers, i.e. lawn mowers having a blade rotating horizontally relative to the grass, are generally more recent.

In regard to ganging reel-type lawn mowers together, drawbacks normally associated with such reel-type mowers carry over to a ganged assembly of the same. For instance, the reel lawn mowers are not considered as efficient on rough terrain as their four-wheeled rotary counterparts. Reel lawn mowers are also subject to jamming, as by sticks and other debris, unlike rotary lawn mowers. Reel mowers also typically require a significant downward force to be applied thereon to effect proper rotation of the reel for cutting, another problem not associated with a rotary mower.

In regard to ganged rotary mowers, a rotary mower must be able to slide along its lateral axis to a greater extent to follow curves or ground contour changes than its reel-type mower counterpart. Consideration must also be given to the dynamics of a ganged group of rotary lawn mowers, since the individual wheeled mowers have a tendency to flip when towed through turns.

SUMMARY OF THE INVENTION

It is accordingly a principal object of the present invention to provide an improved frame for ganging a plurality of individually powered rotary lawn mowers together for towing by a vehicle for cutting lawn or similar vegetation. It is, moreover, a more particularized object of this invention to provide such a frame which is readily assembled of off-the-shelf rotary lawn mowers, i.e. a frame that can be used to gang a plurality of such off-the-shelf rotary mowers with little retrofit required.

To these and other ends, the present invention comprises a first T-shaped draft bar having a rigid tow bar which is attached at one end to the towing vehicle, such as a tractor, with its other end attached to a cross-bar. This frist draft bar is attached to the forward end of the first rotary lawn mower via a pair of skid units.

Each of the skid units has an elongated ski-shaped skid adapted to slide over the ground, and a bracket fixed to an extending upwardly from the skid. The skid unit is attached to the lawn mower body, preferably at or adjacent the wheel axle hole (wheels having been removed) as by bolting thereto.

The cross-bar of the first draft bar is rotatably attached to the pair of forward skids on the first lawn mower. In the embodiment illustrated herein, this attachment takes the form of insertion of the cross-bar ends into bores formed in the skid bracket upper portion, with cotter pins holding the cross-bar in place.

An intermediate elongated rigid draft bar is attached in a similar fashion to the rearward portion of the first lawn mower. A pair of skid units are affixed to the rearward portion of the first lawn mower, with the intermediate draft bar extending therethrough, and rotatably attached in place.

Second and third T-shaped draft bars are then provided to attach second and third rotary lawn mowers to the intermediate draft bar on either side of the first lawn mower. The respective cutting paths of the second and third lawn mowers slightly overlap the cutting path of the first lawn mower. A pivoting attachment is used for the tow bar of the second and third T-shaped draft bars to enable vertical movement of the second and third lawn mowers relative to the intermediate draft bar (and the first mower). The cross-bars of the second and third draft bars are rotatably attached to a respective pair of skid brackets of skid units which are mounted on opposite forward sides of each of the second and third lawn mowers. Means for supporting the rearward sides of the second and third lawn mowers to cut are also provided, and preferably take the form of additional pairs of skid units attached at the rearward ends of the lawn mowers.

A presently preferred form for the rotatable attachment between the tow bars of the second and third draft bars to the intermediate draft bar comprises a sleeve which is rotatably carried on the intermediate draft bar. A flange affixed to and extending laterally from the sleeve is receivable in a U-shaped hitch formed on a respective tow bar, to thereby hitch the tow bar to the intermediate draft bar in a manner to permit the tow bar some generally unrestrained vertical movement.

The present invention achieves the stated objectives in providing such a frame which has skid units that are readily applied in place of wheels ordinarily carried on off-the-shelf rotary lawn mowers. The standard push-handle and related throttle and kill cables are also removed. No other retrofitting is required for use of the frame, since the various draft bars are received in brackets of the skid units. The number of elements making up the improved gang frame is also minimized.

Significantly, use of skid units as the sole support for the first lawn mower has been found to provide sufficient lateral mobility of that mower to substantially stabilize the ganged assembly from flipping over in turns. Use of skid units on the forward ends of the following second and third mowers is considered to be of further advantage in regard to providing the requisite lateral mobility for successful operation of the ganged rotary mower assembly. The ability of the first lawn mower to freely slide laterally obtained through use of skid units is considered, in particular, to be of critical importance in the successful application of the present invention.

Further understanding of the invention and its advantages can be obtained from consideration of the following detailed description of an embodiment of the invention taken in conjunction with the drawings, in which:

BRIEF DESCRIPTION OF THE DRAWINGS

FIG. 1 is a perspective view of a frame for ganging a plurality of individually power rotary lawn mowers together made in accordance with the present invention;

FIG. 2 is a top plan view of the assembled frame of FIG. 1;

FIG. 3 is an elevational view of the assembled lawn mowers of FIG. 1; and

FIG. 4 is an exploded perspective view of a T-shaped draft bar connection to an intermediate draft bar as well as to a pair of skid units.

DETAILED DESCRIPTION OF AN EMBODIMENT OF THE INVENTION

Referring to the drawings, the rear end of a lawn tractor is generally indicated in fragmentary part at 10. Towed behind the tractor 10 are first, second and third rotary lawn mowers indicated at 11, 12 and 13, respectively. As will be hereafter described, the first lawn mower 11 is directly hitched to the tractor 10, with the second and third lawn mowers 12, 13 hitched to the rearward end of the lawn mower 11. Second and third lawn mowers 12, 13 are spaced to either side of the first lawn mower 11, so that the second and third lawn mowers 12, 13 slightly overlap the cutting swaths of the first lawn mower 11. An extended cutting path is thereby created through this arrangement of the three rotary mowers.

In this illustrated embodiment, all three lawn mowers 11, 12 and 13 wre purchased as off-the-shelf equipment manufactured by Western International Incorporated and sold under its trademark Dynamark. That is, these three lawn mowers did not require any modification other than removal of the wheels provided as standard equipment with the lawn mowers, and the handles and related throttle and kill cables. As previously noted, one of the significant advantages of the present invention is the ability to use the novel ganging frame with substantially unaltered readily-obtainable rotary lawn mowers. This achieves a general economy in making the gang assembly, enables the application of the gang frame to a wide range of available rotary lawn mowers, permits easy replacement of a lawn mower that is broken down, and promotes ready assembly of the gang frame to the lawn mowers, among other things.

It will be noted, however, that mowers having their discharge openings 11a, 12a and 13a extending generally radially outwardly from the mower base (i.e. not directed either forwardly or rearwardly) are considered best suited to the inventive gang frame, since the ordinarily intended direction of movement of one of the rearward mowers will be reversed to avoid spraying grass clippings on a neighboring mower being pulled in tandem. For instance, mower 13 is reversed relative to mower 12 so that discharge opening 13a faces away from mower 12. Alternatively, an appropriate chute could be provided on an unreversed lawn mower to direct clippings away from an adjacent mower.

The mowers 11, 12 and 13 are gas powered, and operate on their own individual motor. The illustrated mowers are pull-started.

The gang frame of the present invention is generally comprised of a first T-shaped draft bar 16, second and third T-shaped draft bars 17 and 18, intermediate draft bar 19, a plurality of skid units 20 and various means to attach the foregoing elements to the lawn mowers and each other.

More specifically, first draft bar 16 has an elongated rigid metal strap or beam forming a tow bar 16a which is fixed at one end to a metal cross bar 16b, as by welding. Formed at the forward end of the tow bar 16a is a U-shaped hitch 16c. Aligned bores through the two legs of the U-shaped hitch 16c receive a connecting pin 23 to thereby connect the hitch 16c to a tractor hitch 24. The first draft bar hitch 16c is thus able to laterally rotate or pivot on the connecting pin 23. Cross-bar 16b of the first draft bar 16 is received in the pair of skid units 20. It is considered most advantageous to have the cross-bar 16b close to the same level as the tractor hitch 24 to keep the front end of the mower 11 from rising off the ground over hummocks.

Each of these skid units 20 is comprised of a ski-shaped skid 20a, here made from metal rod stock, and a rigid metal bracket 20b. The bracket 20b is fixed at its lower end, as by welding, to the skid 20a and extends vertically upwardly from the skid 20a.

Skid 20a has an upwardly curved front portion, and an elongated portion extending off of the curved front end. This elongated portion is in contact with the ground, and it has been found advantageous to make this elongated portion about ten inches long. This enables the skid 20a to bridge holes and other discontinuites in the lawn surface for a more level cut, and particularly to avoid scalping.

Bracket 20b has a plurality of holes 20c, 20d and 20e formed in a generally vertical line along the midline of the bracket 20b. One or more holes 20c are adapted to receive bolts 25 therethrough. The bolts 25 are used to connect the bracket to a respective mower deck or base 11b, 12b and 13b on the outer side of the forward sides thereof, as well as the rearward sides. Advantageously, the bolts 25 fit within the wheel axle holes. The bolts 25 may be screw-threaded to match threads formed in holes formed in the lawn mower decks, and/or threaded at one end to receive nuts thereon for holding the bolts fast to the mower deck. A pair of bolts 25 are used herein for a stable attachment of the bracket 20b. A reinforcing bracket (not shown) is additionally used on the inside of the mower deck, through which the bolts 25 also extend.

Cross-bar 16b of the first draft bar 16 has its ends extending through holes 20d formed in the upper portion of a pair of brackets 20b of skid units 20 attached on either side of the frist lawn mower 11. Hole 20d is sized large enough to permit free rotation of the cross-bar 16b therein. A cotter pin 26 extends through a hole formed adjacent each end of cross-bar 16b to thereby rotatably fix the cross-bar 16b within the holes 20d of the brackets 20b.

Another pair of skid units 20 are attached to respective rearward sides of the first lawn mower deck 11b, again in the area of the wheel holes. Intermediate draft bar 19 extends through holes 20e at the top of the brackets. The holes 20e are slightly wider in diameter than the diameter of the intermediate draft bar 19 to permit free rotation of the latter within the holes 20e. It may be noted that in this embodiment, holes 20e are slightly larger than holes 20d or 20c, since the intermediate draft bar used is slightly larger than the cross bar 16b, for instance. While a separate set of skid units may be provided having such widened holes 20e in the top, it is considered of particular advantage to have all the skid units made identical for easy interchangeability and simplified construction. Thus, holes 20c in which bolts 25 are received may be of one diameter on each bracket, while each bracket would further include larger holes 20d as well as 20e for receiving a cross bar or the intermediate draft bar. Alternatively, the diameters of all of the holes 20c–e could be made the same with the same general diameter being used for the rod-stock received therein.

In regard to the first lawn mower 11, applicant considers that the use of only skid units 20 to support the first lawn mower, i.e. no wheels, is of significant importance to successful application of the invention. Experimentation by applicant has pointed out that the use of wheels to support the first lawn mower 11, even on the rearward portion of the lawn mower, provides insufficient ability for the first lawn mower to slide laterally in conjunction with turns made by the tractor 10. The lawn mower 11 manifests a tendency to tip over when wheels are used with a gang frame assembly of the type being described herein. The use of only skid units 20 to support the first lawn mower 11 is thus considered by applicant to be an important aspect of the invention.

Intermediate draft bar 19 is long enough to have its ends extend to a point where the second and third T-shaped draft bars 17, 18 can be hitched thereto with the second and third lawn mowers 12, 13 thereby towed behind the first lawn mower with their cutting paths slightly overlapping that of the first lawn mower 11. An overlap of cutting swathes of approximately two inches is considered best for ensuring continued overlap through most turns.

Cotter pins 27 extend through holes formed in the intermediate draft bar 19 located outwardly of the brackets 20b. A washer 28 may be additionally provided between a cotter pin 27 and the bracket surface 28 for a better bearing surface with the bracket 20b in rotation of the draft bar 19.

Each of the second and third T-shaped draft bars respectively comprise tow bars 17a, 18a, and cross-bars 17a, 18a, with a U-shaped hitch 17c, 18c at the forward ends of each tow bar. The rearward ends of these tow bars 17a, 18a are attached to the cross-bars 17b, 18b, as by welding.

The hitches 17c, 18c are attached to a respective flange 30 welded at one end to a sleeve 31. A connecting pin 33 passes through bores provided in the legs of the U-shaped hitches 17c, 18c to connect the tow bar to a flange 30 via a bore in the flange to this end.

The sleeves 31 are mounted concentric with the intermediate draft bar 19, and are held in place via cotter pins 34 extending through holes in the intermediate draft bar 19 on either side of the sleeve. Washers 35 are placed between the cotter pins 34 and sleeve ends, again to provide a better bearing surface. This hitching arrangement for the second and third T-shaped draft bars yields some relatively free vertical movement to these latter draft bars. The lawn mowers 12 and 13 can therefore vertically "flow" independently of the first lawn mower 11.

Each of the cross-bars 17b, 18b are attached to a pair of skid units 20 mounted to the forward sides of the lawn mower decks 12b, 13b using cutter pins 38 extending through holes formed in the ends of the cross-bars outwardly of the brackets 20b. As shown in FIG. 4, a number of holes may be provided in the cross-bars (including cross-bar 16b and draft bar 19) to enable adjustment to accommodate various mower deck widths.

The embodiment of the invention illustrated herein uses additional skid units 20 on the rearward sides of the lawn mower decks 12b and 13b. Skids are considered most advantageous in the application of this gang frame to rotary lawn mowers, as noted above. Wheels may, however, be substituted for the skid units 20 at the rearward sides of the mower decks 12b and 13b, although this is considered less desirable.

Thus, while the invention has been described in relation to a particular embodiment, those skilled in the art will recognize various modifications of structure, elements, material and the like which may further facilitate application of the invention, while still falling within the scope of the invention.

What is claimed is:

1. A frame for ganging a plurality of individually powered rotary lawn mowers together for towing by a vehicle in cutting lawn or similar vegetation, comprising:
   a first T-shaped draft bar having an elongated rigid tow bar attached at a first end to a rigid cross-bar, and means formed on a second end of said tow bar for pivoting attachment to the vehicle for towing,
   a plurality of pairs of skid units each having an elongated ski-shaped skid adapted to slide over lawns, a bracket fixed to and extending upwardly from said ski-shaped skid, means for attaching said bracket to a lawn mower body in a manner to support said lawn mower to cut, and means for receiving said draft bar cross-bar on said bracket,
   means for rotatably attaching said draft bar cross-bar to a pair of said skid brackets of skid units respectively mounted to opposite forward sides of a first lawn mower body,
   an intermediate elongated rigid draft bar,
   means for attaching said intermediate draft bar to a pair of said skid brackets of skid units mounted to opposite rearward sides of the first lawn mower for towing second and third lawn mowers,
   second and third T-shaped draft bars each having an elongated tow bar attached at a first end to a rigid cross-bar, and means formed on a second end of said tow bar for attachment to said intermediate draft bar on either side of the first lawn mower such that respective cutting paths of the second and third lawn mowers attached to said second and third draft bars at least slightly overlap a cutting path of the first lawn mower,
   means for pivotally attaching each of said second and third draft bar cross-bars to a respective pair of said skid brackets of skid units mounted to opposite forward sides of each of the second and third lawn mowers, and
   means for supporting rearward sides of the second and third lawn mowers to cut.

2. The gang frame of claim 1 wherein said means for attaching each said skid unit bracket to a lawn mower body comprises a plurality of bores defined in a vertically extending row in said bracket, and at least one bolt receivable in a respective bore and also in a bore formed in a lawn mower body to fix said bracket to the outside of the lawn mower body.

3. The gang frame of claim 2 wherein said means for attaching respective second ends of said second and third tow bars to said intermediate draft bar comprises a sleeve having two ends rotatably carried on said intermediate draft bar, a flange affixed to and extending laterally from said sleeve, and stops located on said intermediate draft bar adjacent either end of said sleeve to maintain said sleeve's position on said intermediate draft bar, and a bore defined in said flange through which a pin can extend to hitch said flange to a respective second end of a tow bar of said second and third draft bars.

4. The gang frame of claim 3 wherein said means for supporting the rearward sides of respective second and third lawn mowers comprises a pair of skid units having their brackets mounted to opposite rearward sides of the second and third lawn mowers.

5. A frame for ganging together a plurality of individually powered off-the-shelf rotary lawn mowers for towing by a lawn tractor in cutting grass, comprising:
 a first T-shaped draft bar having an elongated rigid tow bar attached at a first end to a rigid cross-bar, and means formed on a second end of said tow bar for pivotal attachment to the tractor for towing,
 a plurality of pairs of skid units each having an elongated ski-shaped skid adapted to slide over lawns, a bracket fixed to and extending upwardly from said ski-shaped skid, a plurality of bores defined in a vertically extending row in said bracket, at least one bolt receivable in a respective bore and also in a bore formed in a lawn mower body to fix said bracket to the outside of the lawn mower body, and means for receiving said draft bar cross-bar on said bracket,
 means for rotatably attaching said draft bar cross-bar to a pair of said skid brackets of skid units respectively mounted to opposite forward sides of a first lawn mower body,
 an intermediate elongated rigid draft bar,
 means for attaching said intermediate draft bar to a pair of said skid brackets of skid units mounted to opposite rearward sides of the first lawn mower for towing second and third lawn mowers,
 second and third T-shaped draft bars each having an elongated tow bar attached at a first end to a rigid cross-bar, and means formed on a second end of said tow bar for attachment to said intermediate draft bar on either side of the first lawn mower such that respective cutting paths of the second and third lawn mowers attached to said second and third draft bars at least slightly overlap a cutting path of the first lawn mower,
 a rotatable hitch for pivotally attaching each of said second and third draft bar cross-bars to a respective pair of said skid brackets of skid units mounted to opposite forward sides of each of the second and third lawn mowers, said rotatable hitch having a sleeve with two ends rotatably carried on said intermediate draft bar, a flange affixed to and extending laterally from said sleeve, stops located on said intermediate draft bar adjacent either end of said sleeve to maintain said sleeve's position on said intermediate draft bar, and a bore defined in said flange through which a pin can extend to hitch said flange to a respective second end of a tow bar of said second and third draft bars, and
 means for supporting rearward sides of the second and third lawn mowers to cut.

* * * * *